United States Patent [19]

Koel et al.

[11] 4,165,525
[45] Aug. 21, 1979

[54] MAGNETIC HEAD HAVING A CORE PROVIDED ON A SUBSTRATE BY MEANS OF THIN-FILM TECHNOLOGY

[75] Inventors: Gerrit J. Koel; Willem F. Druyvesteyn, both of Eindhoven, Netherlands

[73] Assignee: U.S. Philips Corporation, New York, N.Y.

[21] Appl. No.: 877,825

[22] Filed: Feb. 15, 1978

[51] Int. Cl.² ............................ G11B 5/12; G11B 5/20
[52] U.S. Cl. .................................... 360/125; 360/123
[58] Field of Search ................ 360/127, 126, 123, 125

[56] References Cited
PUBLICATIONS

Romankiw, "Thin Film ... Heads", IBM Tech. Disc. Bull., vol. 18, No. 1, Jun. 1975, pp. 19-22.

Primary Examiner—Robert S. Tupper
Attorney, Agent, or Firm—Robert S. Smith

[57] ABSTRACT

A thin-film magnetic head in which the electrically conductive magnetic material of the core is wound directly a number of times around an electrical conductor which ensures the energization of the head presents the advantage that the manufacture can take place by means of exclusively electroplating methods, since in this configuration no insulating layers are necessary between the material of the core and the conductor.

3 Claims, 6 Drawing Figures

MAGNETIC HEAD HAVING A CORE PROVIDED ON A SUBSTRATE BY MEANS OF THIN-FILM TECHNOLOGY

The invention relates to a magnetic transducer head having a magnetic flux conductive core of metallic ferro-magnetic material deposited on a non-magnetic substrate by means of a thin-film technology process, and means for generating a magnetic flux in the core.

A magnetic head of this kind is described in British Patent Specification No. 1,117,067. The patent discloses a head manufactured by means of thin-film technology which is formed by successively providing on a substrate a first electrically conductive pattern of strips, a first insulating layer, a layer of metallic ferromagnetic material, a second insulating layer, and a second pattern of conductive strips. The second pattern of strips is connected to said first pattern in such manner as to form an electrical winding with which a magnetic flux can be generated in the magnetic layer when a current is passed through the winding. A disadvantage of this construction of head is that two insulating layers (usually glass) are necessary between the core material (usually a nickel-iron alloy) and the winding so as to prevent the turns of the winding from being electrically short-circuited. The need to provide said two insulating layers requires the use of additional process steps during the manufacturing operation.

It is an object of the invention to provide a magnetic head of the aforementioned kind which can be manufactured in a simple manner without requiring the deposition of insulating layers. For that purpose the magnetic head according to the invention is characterized in that the flux generating means comprises a flat pattern of electrical conductors and in that a plurality of flat turns formed from the core material are wound directly around a part of the conductor pattern.

An advantage of the configuration in which the magnetic material is laid directly on the electrical conductor is that the current which is passed through the conductor does not flow to any significant extent through the metallic magnetic material of the core wound around it because the path length through the core material is longer than that through the conductor. This construction can allow the insulating layers to be omitted. If in the head of the aforementioned patent with the electrical conductor wound around the magnetic material, there had been an omission of the insulation layers, the winding turns would become shortcircuited since the current flow would then take a short path through the core material instead of the path through the turns.

Within the scope of the invention, several alternative configurations are possible. In one example, the manufacturing operation can start from a metallized substrate and the metallic ferromagnetic layers for the core and the conductive material can be formed thereon via electrode-position methods. In the manufacture of the head configuration of the forementioned patent on the contrary, sputtering steps to provide the glass deposit for the insulation layer are needed in addition to the steps of the electrode-position process.

In one embodiment, the magnetic head is characterized by a first core pattern of metallic ferromagnetic material which is provided on the substrate, a pattern of electrical conductors which is provided on the first core pattern and on the substrate and partly covers the first core pattern, and by a second core pattern of metallic ferromagnetic material which is provided on the pattern of conductors, the first core pattern and the substrate and partly covers the first core pattern while forming at least two flat turns, a part of the first core pattern on which a part of the pattern of conductors is provided and a part of the second core pattern provided thereon forming two poleshoes separated by a non-magnetic gap.

A configuration as described above is very simple to manufacture. Since, however, both the turns and the poleshoes have to be formed from the core material, the poleshoe configuration is not readily adapted to specific applications, which may be experienced as a disadvantage in certain circumstances.

To overcome this problem a second embodiment of the magnetic head according to the invention is characterized in that a closed path for conducting magnetic flux is formed from the material of the core, and a flat turn which is laid around the core couples same to a second core which comprises a first and a second magnetic layer, of which layers the ends are connected together magnetically in a first place and form poleshoes which are separated from each other by a part of the flat turn in a second place.

An advantage of this configuration is that it is built up from two magnetic cores. A first one of said cores is laid around a conductor in a number of turns and the second core forms a separate magnetic flux path with separate poleshoes the selected configuration of which is capable of a wide variation.

The invention will be described in greater detail, by way of example, with reference to the accompanying drawings but is not restricted to this embodiment.

In the drawings

Figure 1:
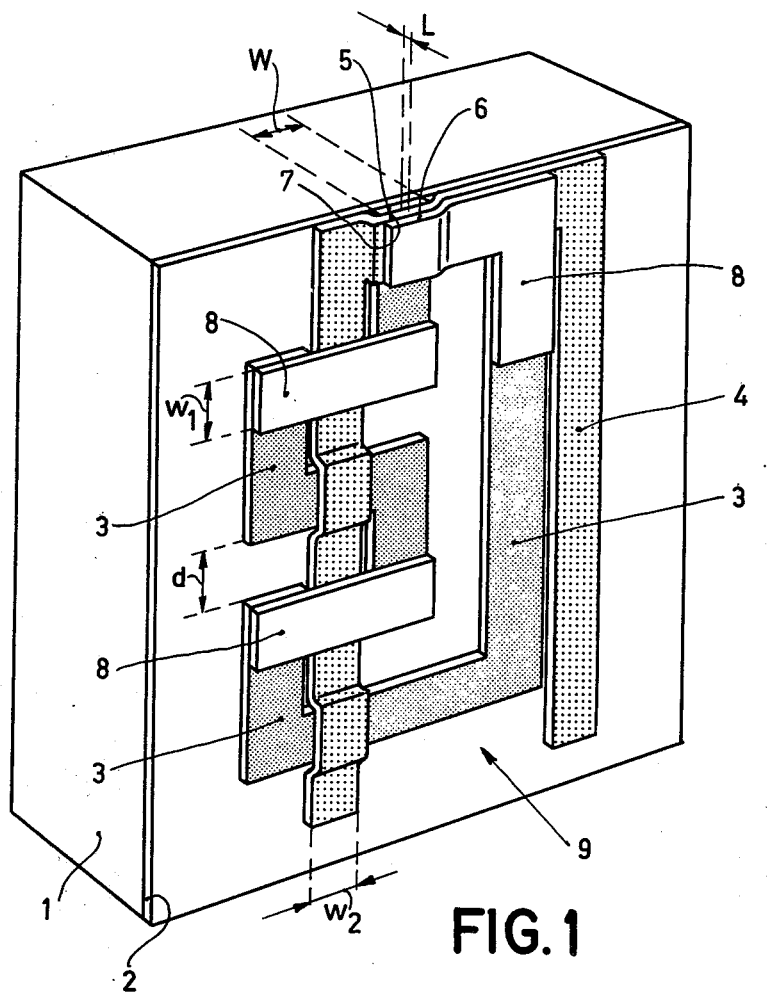
FIG. 1 is a side elevation of an embodiment of a magnetic head according to the invention which is shown in a partially assembled state.
Figure 2A:
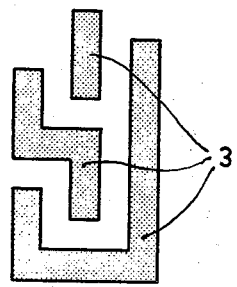
FIG. 2 shows a first core pattern, FIG. 2c a second core pattern and FIG. 2b a conductor pattern used in assembling the head shown in FIG. 1.
Figure 2B:
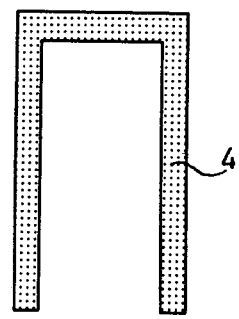
Figure 2C:
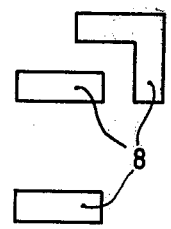

FIG. 1 shows a multiturn magnetic head comprising a non-magnetic substrate, in this embodiment the substrate is a silicon slice 1, on which a pattern of conductors and patterns of magnetic material are provided by means of thinfilm technology. The head 9 also comprises a core of metallic ferromagnetic material which is composed of the parts 3 and 8 which form three flat turns which are wound around a flat electrical conductor 4. The ends of the parts 3 and 8 form poleshoes 5 and 6, while the region between these poleshoes acts as a transducing gap 7. During the manufacturing operation the slice 1 is oxidized and provided, by means of sputtering, with a so-called plating base 2 which has a thickness of 1000 Å and consists of an electrically conductive material on which a desired electrode pattern can be grown by means of electrodeposition methods. During the manufacturing process, a layer of photolacquer (not shown) is provided on said plating base 2. At the area where the pattern a (see FIG. 2) is to be provided, the photolacquer is removed by means of exposure to light through a suitable mask and development. In the lacquer pattern thus obtained, a layer 3 of nickeliron ($Ni_{80}Fe_{20}$), approximately 4 microns thick, is grown in a electroplating bath according to pattern a which forms the first layer of a magnetic core. The pattern of photolacquer is then removed and a fresh layer of photolacquer is provided of which the lacquer is removed in places where the pattern b (see FIG. 2) is to be provided by means of exposure to light and development. In the lacquer pattern thus obtained a layer 4 of copper, approximately 4 microns thick, is grown in an electroplating bath according to the pattern b. Said thickness is necessary for a good operation of the magnetic head described here. The thickness of the copper layer 4 at the area where the ends of the magnet core form poleshoes 5 and 6 also determines the length of the effective gap 7 of the magnetic head. When a gaplength L is desired which is less than the thickness of the copper layer 4, this may be grown, for example, in two steps, the first step determining the gaplength and the second determining the thickness of the part of the layer of conductors which is not present between the poleshoes 5 and 6. The pattern of photolacquer used is then removed and a fresh layer of photolacquer is provided of which at the area where the pattern c (see FIG. 2) is to be provided the lacquer is removed by means of exposure to light and development. In the lacquer pattern thus formed, a layer 8 of nickel-iron ($Ni_{80}Fe_{20}$), thickness 4 microns, is grown according to pattern c in an electroplating bath. The layers 3 and 8 then form a magnetic core which is wound three times around the conductor 4 and has two ends which constitute poleshoes 5 and 6 which are separated from each other by the non-magnetic material of the layer 4. Finally, the last-used pattern of photolacquer, as well as the excessive unused portion of the plating base 2 are to be removed, which may be done, for example, by means of sputter-etching. FIG. 1 shows the magnetic head according to the invention before this step has been carried out. The sputter-etching step slightly attacks the grown copper and nickel-iron layers but due to the small thickness of the plating base 2 only a short period of time is necessary for the sputter-etching step so that in practice the effect of the said attack is negligible. If desired, the formed three-turn-magnetic head 9 may be covered with a protective layer of quartz (not shown).

Figure 3:
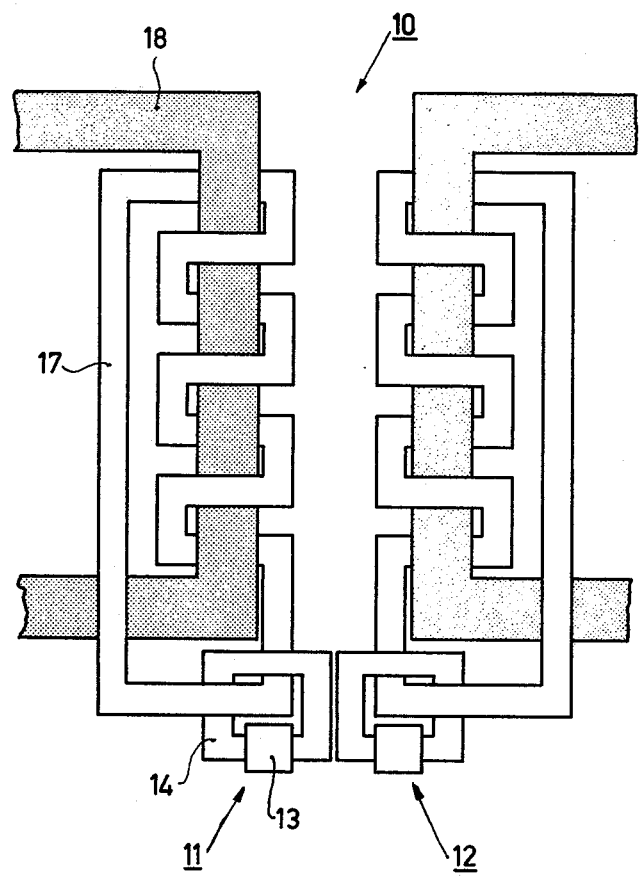
FIG. 3 is a plan view of a double-track magnetic head configuration in which the principle of the invention is used.
Figure 4:
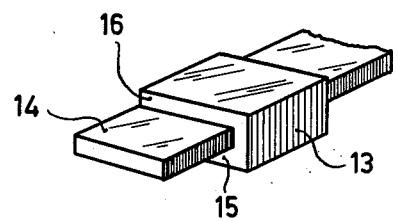
FIG. 4 is a side elevation of a part of the head configuration shown in FIG. 3.

As a result of the above described construction, the poleshoe configuration is already fixed beforehand to a considerable extent. If one wants to be less restricted in choice of the poleshoe configuration, the alternative construction shown diagrammatically in FIG. 3 may be preferable. FIG. 3 is a plan view of a double track magnetic head 10 which consists of two mirror-symmetrical single heads 11 and 12. Since the construction of the heads 11 and 12 is similar, only the construction of head 11 will be described in detail. The head 11 consists of a first magnetic core 13 which is wound once around an electrical conductor 14 as shown in the side elevation view-depicted in FIG. 4. The ends of the core 13 constitute poleshoes 15 and 16 which are separated from each other by the non-magnetic material of the conductor 14. Via the conductor 14 the magnet core 13 is coupled to a second magnetic core 17 which is wound four times around a conductor 18 in the manner as described above. In fact, the left hand half of FIG. 3 shows a single turnhead having a transformer. The poleshoe configuration in this construction is capable of variation through a wide range. A further advantage is that, since the turns of the magnetic core 17 are situated mainly behind the poleshoes, and not beside them, the construction of the head 11 is suitable to be combined with a second similar head (in this case the head 12) to form a double track head.

The properties of the three-turn-head shown in FIG. 3 have been measured in a disk memory apparatus in which the surface speed of the disk was 40 m/sec and the height on which the head was floating above the surface was 0.5 micron. With a track width W of 50 microns, a gap length L of 2 microns and a relative permeability of the material of the magnetic core of 2500, the output voltage obtained was 0.1 mV. This corresponds to 65% of the output voltage which a conventional thin-film head having three turns (conductor wound around the core; insulation between core and winding) can theoretically supply under the same conditions.

With respect to the dimensions of the head shown in FIG. 1 it may be noted that the widths $W_1$ and $W_2$ of the provided pattern were each 50 microns and that the distance d between the turns was 10 microns.

What is claimed is:

1. A thin film magnetic transducing head which includes a non-magnetic substrate, a high permeability magnetic circuit structure of metallic ferromagnetic material disposed on said substrate and means for generating a magnetic flux in said magnetic circuit structure, said magnetic circuit structure having the form of a loop, said loop having two end portions which are positioned in spaced, overlapping relationship, said two end portions each being pole shoes which define a transducing gap between them, said flux generating means including an electrical conductor, a first portion of said conductor being located in said transducing gap, and wherein a portion of said loop forms a multiturn winding which is wound around a second portion of said electrical conductor.

2. A thin film magnetic transducing head as claimed in claim 1, wherein said magnetic circuit comprises a first core pattern of metallic, ferromagnetic material disposed on said substrate; said electrical conductor being an electrically conductive pattern disposed on said first core pattern and on said substrate and partly covers said first core pattern; and a second core pattern of metallic ferromagnetic material which is provided on said pattern of conductors, said first core pattern and said substrate and partly covers said first core pattern and forms at least two turns about said conductor, said turns being formed by a plurality of generally planar first and second core elements having portions disposed in overlapping relationship.

3. A thin film magnetic transducing head as claimed in claim 4 wherein there is no insulation intermediate said magnetic circuit structure and said portion of said loop which forms a multiturn winding around said second portion of said electrical conductor.

* * * * *